(12) United States Patent
Zhang (10) Patent No.: US 11,118,762 B1
(45) Date of Patent: Sep. 14, 2021

(54) LAMP

(71) Applicant: SHENZHEN YUYIYUAN TECHNOLOGY CO., LTD, Shenzhen (CN)

(72) Inventor: Donglin Zhang, Guang'an (CN)

(73) Assignee: SHENZHEN YUYTYUAN TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/020,769

(22) Filed: Sep. 14, 2020

(51) Int. Cl.
| | | |
|---|---|---|
| *F21V 17/00* | (2006.01) |
| *F21V 17/16* | (2006.01) |
| *F21S 9/03* | (2006.01) |
| *F21W 131/10* | (2006.01) |
| *F21V 21/08* | (2006.01) |
| *F21S 6/00* | (2006.01) |
| *F21V 17/10* | (2006.01) |
| *F21V 1/12* | (2006.01) |
| *F21V 1/06* | (2006.01) |
| *F21V 1/24* | (2006.01) |
| *F21V 15/01* | (2006.01) |

(52) U.S. Cl.
CPC ........... *F21V 17/007* (2013.01); *F21S 9/037* (2013.01); *F21V 17/164* (2013.01); *F21S 6/005* (2013.01); *F21S 6/006* (2013.01); *F21S 6/007* (2013.01); *F21S 6/008* (2013.01); *F21V 1/06* (2013.01); *F21V 1/12* (2013.01); *F21V 1/24* (2013.01); *F21V 15/012* (2013.01); *F21V 17/107* (2013.01); *F21V 21/0824* (2013.01); *F21W 2131/10* (2013.01)

(58) Field of Classification Search
CPC ..... F21V 1/06; F21V 1/12; F21V 1/24; F21V 17/107; F21V 21/0824; F21V 15/012; F21S 9/037; F21S 6/005; F21S 6/006; F21S 6/007; F21S 6/008; F21W 2131/109
See application file for complete search history.

(56) References Cited

U.S. PATENT DOCUMENTS

| | | | | |
|---|---|---|---|---|
| 662,474 | A * | 11/1900 | Stonebridge | F21V 1/06 362/162 |
| 836,411 | A * | 11/1906 | Stonebridge | F21V 1/06 362/162 |
| 6,821,002 | B1 * | 11/2004 | Morgen | F21S 6/005 362/351 |
| 9,279,554 | B1 * | 3/2016 | Wierzbinski | F21S 9/035 |
| 10,941,914 | B1 * | 3/2021 | Hollinger | H05B 45/20 |

(Continued)

FOREIGN PATENT DOCUMENTS

| | | | | |
|---|---|---|---|---|
| GB | 237653 | A * | 7/1925 | F21V 1/02 |
| WO | WO-2012088703 | A1 * | 7/2012 | F21S 6/005 |

OTHER PUBLICATIONS

Machine translation of WO 2012088703 A1 retrieved from WIPO IP Portal, Patentscope. (Year: 2021).*

*Primary Examiner* — Alexander K Garlen
*Assistant Examiner* — Colin J Cattanach (57) ABSTRACT

The present disclosure provides a lamp. The lamp includes a housing with an inner cavity and a lamp base. At least a portion of the lamp base is disposed in the inner cavity. The housing includes a plurality of supporting frames. The supporting frames are movably connected end by end to enclose the inner cavity. Two adjacent supporting frames are detachably connected with each other.

17 Claims, 6 Drawing Sheets

(56) References Cited

U.S. PATENT DOCUMENTS

| | | | | |
|---|---|---|---|---|
| 2002/0105810 | A1* | 8/2002 | Alley | F21V 35/00 |
| | | | | 362/351 |
| 2003/0201874 | A1* | 10/2003 | Wu | A01M 29/16 |
| | | | | 340/384.2 |
| 2007/0236923 | A1* | 10/2007 | Fan | F21S 9/037 |
| | | | | 362/183 |
| 2007/0285023 | A1* | 12/2007 | Cooper | F21S 9/037 |
| | | | | 315/149 |
| 2013/0027918 | A1* | 1/2013 | White | F21S 9/037 |
| | | | | 362/157 |
| 2014/0218901 | A1* | 8/2014 | Richmond | G10K 1/07 |
| | | | | 362/183 |
| 2014/0362560 | A1* | 12/2014 | Formico | A01M 1/04 |
| | | | | 362/96 |
| 2015/0049513 | A1* | 2/2015 | Haubach | F21V 23/06 |
| | | | | 362/648 |
| 2015/0267901 | A1* | 9/2015 | Cohen | F21V 17/007 |
| | | | | 362/282 |
| 2015/0338040 | A1* | 11/2015 | Swope | F21V 5/008 |
| | | | | 362/183 |
| 2016/0040841 | A1* | 2/2016 | Martzall | F21V 31/005 |
| | | | | 362/183 |
| 2016/0377247 | A1* | 12/2016 | Chang | F21S 9/037 |
| | | | | 362/158 |

* cited by examiner

LAMP

TECHNICAL FIELD

The present disclosure relates to a field of lighting, and in particular to a lamp.

BACKGROUND

An outdoor solar lamp generally uses solar energy as a power supply for night lighting, which adopts high-efficiency LED lighting source, has advantages such as high brightness, easy installation, stable and reliable work, no cables, no conventional energy consumption, long service life, etc. At present, like most public facilities, a conventional outdoor solar lamp basically has limited functions, such as to provide a light source and to beautify an overall layout. However, the functions are simple, which is not conducive to scientific development. Moreover, outdoor solar lamps in the prior art are not foldable, which is inconvenient in packaging, high in transportation and processing costs.

SUMMARY

In order to solve above problems, the present disclosure provides an outdoor solar lamp. The outdoor solar lamp is able to be quickly disassembled and assembled, which facilitates production and transportation and reduces production costs.

To achieve the above object, the present disclosure provides a lamp. The lamp comprises a housing with an inner cavity and a lamp base. At least a portion of the lamp base is disposed in the inner cavity. The housing comprises a plurality of supporting frames. The supporting frames are movably connected end by end to enclose the inner cavity. Two adjacent supporting frames are detachably connected with each other.

Furthermore, the plurality of supporting frames comprises first supporting frames and second supporting frames. At least some of the first supporting frames comprise rotating shafts. At least some of the second supporting frames comprise bayonets. The rotating shafts are engaged with the bayonets of the second supporting frames. The first supporting frames or the second supporting frames are foldable with respect to connection positions of the first supporting frames and the second supporting frames. The first supporting frames and the second supporting frames are detachable from each other.

Furthermore, the bayonets are C-shaped bayonets.

Furthermore, the lamp further comprises a lower fixing frame. The lower fixing frame is arranged on a bottom portion of the supporting frames. The lower fixing frame is arranged opposite to the lamp base.

Furthermore, the lamp base comprises an upper cover and an upper fixing frame. A closed chamber is arranged in the lamp base. At least portions of a control module, a power module and lamp beads are arranged in the closed chamber.

Furthermore, the power module comprises a solar panel arranged on a top portion of the upper cover and a rechargeable battery electrically connected with the solar panel. The rechargeable battery is arranged in the closed chamber. A top portion of the upper cover defining a wire hole communicated with the closed chamber. And conductive wires of the solar panel pass through the wire hole to electrically connect with the rechargeable battery.

Furthermore, a waterproof ring is arranged on a portion enclosed by the upper cover and the upper fixing frame.

Furthermore, both of the upper fixing frame and the lower fixing frame comprise a bottom surface and a plurality of side surfaces. Through holes are arranged on the bottom surface of the upper fixing frame. At least some of the lamp beads stretch out from the through holes.

Furthermore, the control module comprises a power switch. The power switch stretches out downward from the bottom surface of the upper fixing frame.

Furthermore, first snaps are arranged on at least some of the side surfaces of the upper fixing frame. First snap positions matching with the first snaps are arranged on the supporting frames.

Furthermore, second snaps are arranged on at least some of the side surfaces of the lower fixing frame. Second snap positions matching with the second snaps are arranged on the supporting frames.

Furthermore, a limiting groove is arranged between two adjacent side surfaces of the upper fixing frame and the lower fixing frame. Rotating shafts and the bayonets are arranged in the limiting groove.

Furthermore, both of the lower fixing frame and the supporting frames comprise hollowed-out holes.

Furthermore, a pointed insert is arranged on the lower fixing frame.

Furthermore, the pointed insert comprises a connecting tube and a ground inserting rod. The ground inserting rod is of a cross cone shape. A bottom portion of the ground inserting rod is of a tip structure.

Furthermore, the lower fixing frame comprises a mounting portion extending along the pointed insert. The mounting portion comprises a mounting hole configured to fix the connecting tube.

Furthermore, a number of clamping portions are arranged on an inner wall of the mounting hole along a circumferential direction. The connecting tube is detachably connected with the lower fixing frame.

Furthermore, the mounting hole comprises internal threads. External threads matching the internal threads are arranged on an outer wall of the connecting tube.

Furthermore, the lamp base is of trapezoidal structure.

The lamp comprises a plurality of supporting frames movably connected end by end, and the connecting portions between two adjacent supporting frames are separable, so that a main body of the entire lamp is foldable or is quickly disassembled, which reduces storage space, saves transportation costs and reduces processing costs.

Other public facilities are able to be stored inside the housing enclosed by multiple supporting frames, thereby providing convenience for people.

Other beneficial effects of the present disclosure are further clarified in the specific embodiments.

10—lamp base; 11—upper cover; 12—upper fixing frame; 13—control module; 14—power module; 15—lamp beads; 16—solar panel; 17—waterproof ring; 18—power switch; 101—closed chamber; 102—wire hole; 120—bottom surface; 121—side surface; 1210—first snap; 1211—limiting groove; 1212—through hole;

20—housing; 21—supporting frame; 200—hollower-out hole; 201—inner cavity; 210—first supporting frame; 211—second supporting frame; 212—third supporting frame; 2101—rotating shaft; 2102—bayonet; 2103—first snap position; 2104—second snap position;

30—lower fixing frame; 31—mounting portion; 3001—second snap; 3002—mounting hole; 3003—clamping portion; and 40—pointed insert 41—connecting tube; 42—ground inserting rod.

DETAILED DESCRIPTION

The present disclosure and the technical solutions in the embodiments of the present disclosure will be described clearly and completely below with reference to the accompanying drawings. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

It should be noted that when a component is said to be "fixed to" another component, it can be directly disposed on another component or disposed on another component through other connecting pieces. When a component is considered to be "connected" to another component, it can be directly connected to another component or it may be connected to another component through other medium. When a component is considered to be "installed on" another component, it can be directly installed on another component or installed on another component through other medium. The terms "vertical", "horizontal", "left", "right" and similar expressions used herein are for illustrative purposes only.

Unless otherwise defined, all technical and scientific terms used herein have the same meaning as commonly understood by those skilled in the art of the present disclosure. The terms used in the description of the present disclosure herein are only for the purpose of describing specific embodiments, and are not intended to limit the present disclosure. The term "and/or" as used herein includes any and all combinations of one or more related listed items.

The present disclosure discloses a lamp, the lamp can be a garden lamp, a grass lamp, a road lamp, a decorative lamp and etc.

In some embodiments, as shown in FIGS. 1-11, the lamp comprises a housing 20 with an inner cavity 201 and a lamp base 10. At least a portion of the lamp base 10 is disposed in the inner cavity 201.

In some embodiments, the lamp base 10 is of trapezoidal structure. It should be understood that the structure of the lamp base of the present disclosure is not limited thereto. The lamp base 10 emits light to the inner cavity 201. When the housing 20 is made of light-transmitting material or comprises light-transmitting holes, the lamp provide illumination for surrounding environment.

Figure 1:
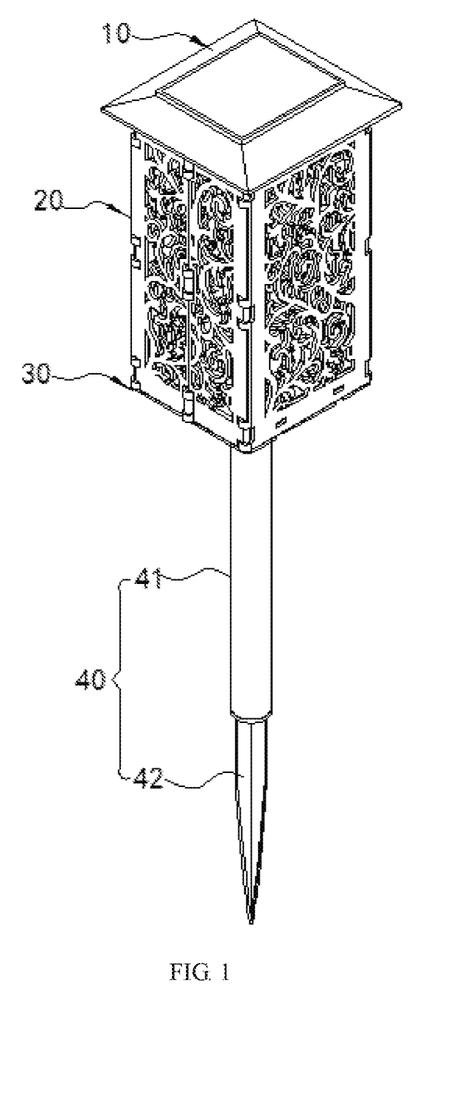
FIG. 1 is a perspective schematic diagram showing a structure of a lamp of the present disclosure.
Figure 2:
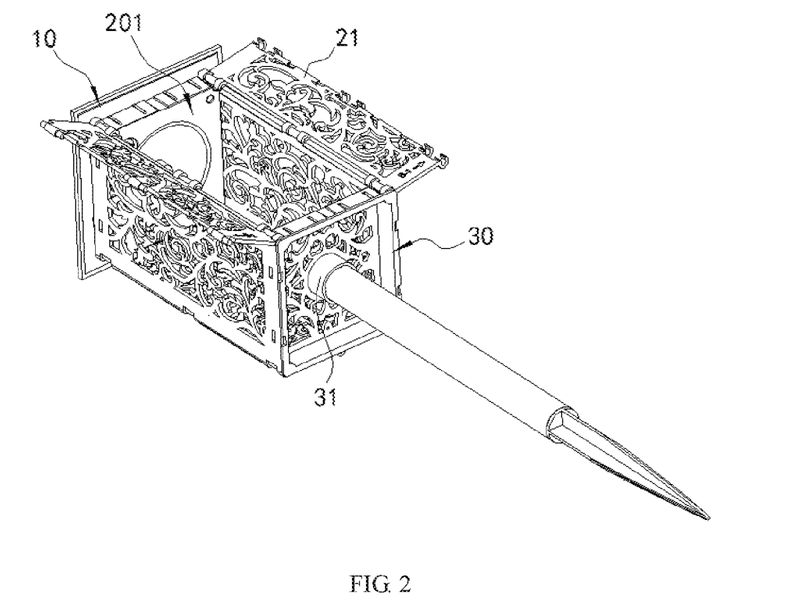
FIG. 2 is a schematic diagram showing the structure of the lamp of the present disclosure where the lamp is in an open state.

In some embodiments, the housing 20 comprises a plurality of supporting frames 21. The supporting frames 21 are movably connected end by end to enclose the inner cavity 201. Two adjacent supporting frames 21 are detachably connected with each other. As shown in FIG. 2, the two adjacent supporting frames 21 are rotatable and detachable, a user can open the two adjacent supporting frames 21 to expose the inner cavity 201, which is convenient for the user to store or take out public facilities, such as public seats, fitness equipment, fire-fighting supplies, etc., from the inner cavity 201.

Figure 6:
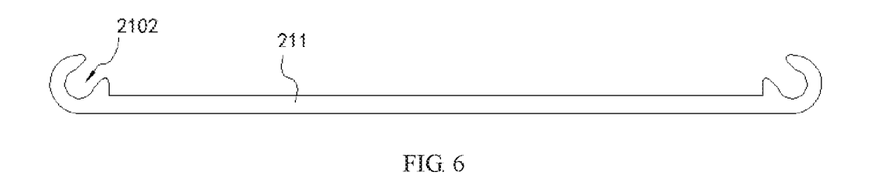
FIG. 6 is a schematic diagram showing a structure of a second supporting frame of the present disclosure.
Figure 7:
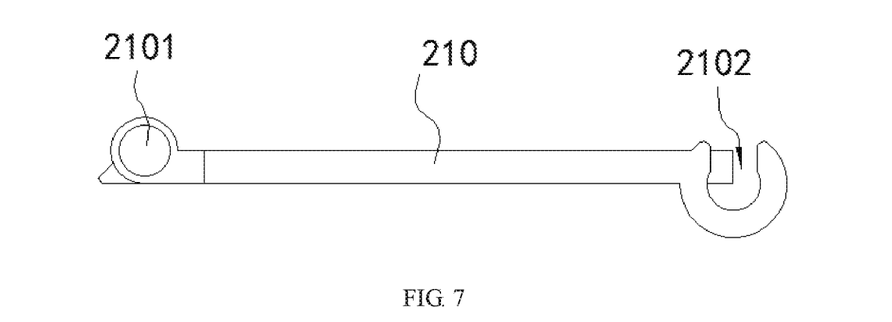
FIG. 7 is a schematic diagram showing a structure of a first supporting frame of the present disclosure.
Figure 8:
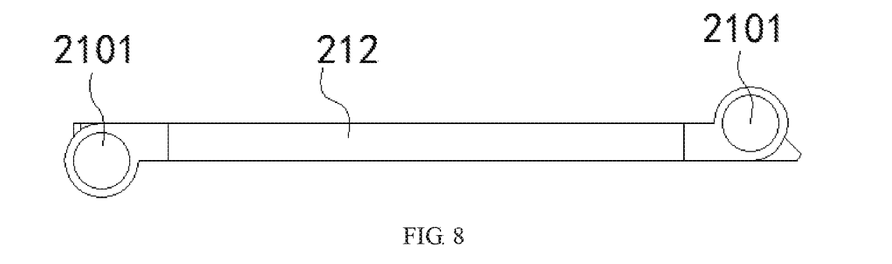
FIG. 8 is a schematic diagram showing a structure of a third supporting frame of the present disclosure.

As shown in FIGS. 6-8, the embodiment provides three different structures of the supporting frames 21. Two connecting ends of each first supporting frame 210 are a rotating shaft 2101 and a bayonet 2102 respectively. Two connecting ends of each second supporting frame 211 are bayonets 2102, and two connecting ends of each third supporting frame 212 are all rotating shafts 2101 or all bayonets 2102. The user may make different combinations through the multiple supporting frames 21 with different structures mentioned above. For example, the rotating shafts 2101 of the first supporting frames 210 are inserted into the bayonets 2102 of the second supporting frames 211, and the rotating shafts 2101 of the third supporting frames 212 are inserted into the bayonets 2102 of the first supporting frames 211. The above-mentioned supporting frames 21 are connected end by end to enclose the housing 20 shown in FIG. 1. In some embodiments, the bayonets 2102 are C-shaped bayonets.

Figure 3:
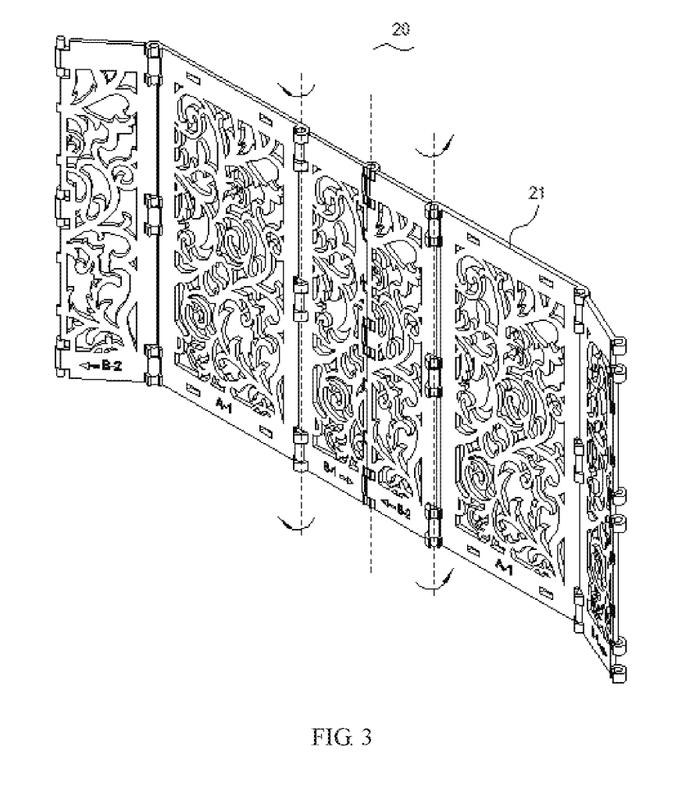
FIG. 3 is a schematic diagram showing an unfolded structure of a housing of the present disclosure.
Figure 4:
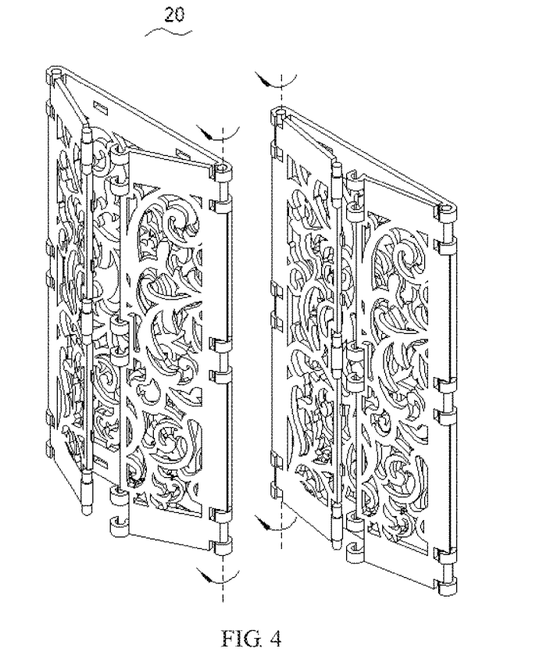
FIG. 4 is a schematic diagram showing a folded structure of the housing of the present disclosure.
Figure 5:
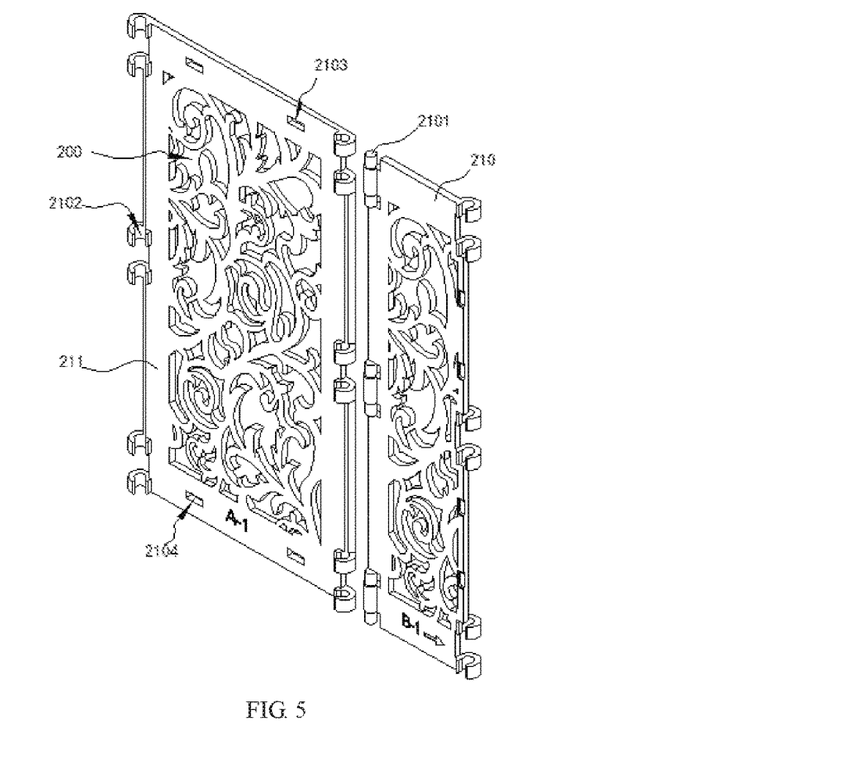
FIG. 5 is a schematic diagram showing two different types of supporting frames of the present disclosure.

In the above-mentioned embodiment, the different supporting frames 21 that enclose the housing 20 are able to be folded, separately stacked, partially assembled. or unfolded into a state shown in FIG. 3 for transportation or storage by a manufacturer or the user, which helps the manufacturer to save processing, and transportation costs and help the user to reduce storage space.

In some embodiments, the lamp further comprises a lower fixing frame 30. The lower fixing frame 30 is arranged on a bottom portion of the housing 20. The lower fixing frame 30 is arranged opposite to the lamp base 10 to close a lower opening of the housing 20. A pointed insert 40 is arranged on a bottom portion of the lower fixing frame 30. In some embodiments, the pointed insert 40 comprises a connecting tube 41 and a ground inserting rod 42. The ground inserting rod 42 is of a cross cone shape that a bottom portion of the ground inserting rod 42 is of a tip structure, or the ground inserting rod 42 is a column with a sharp end, so that the ground inserting rod 42 is easily inserted into soil and sand, and ensure a certain stability after insertion.

Figure 11:
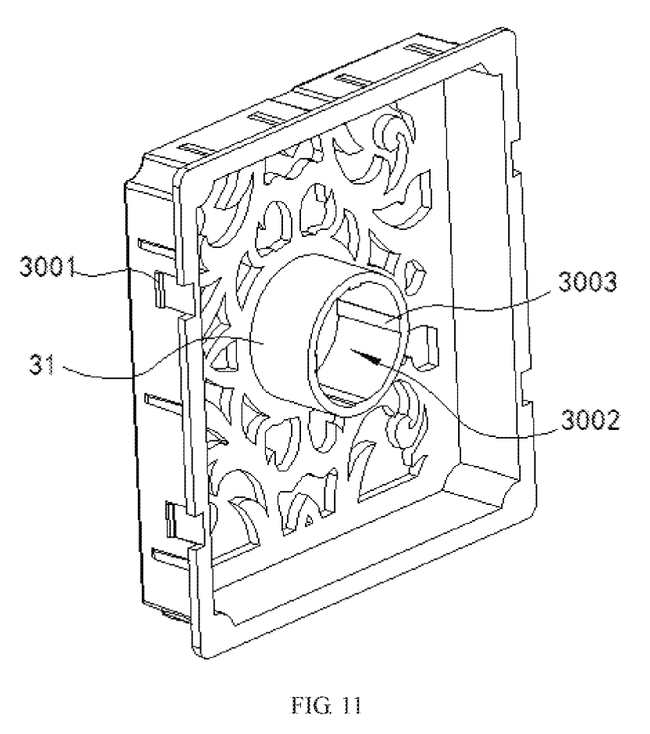
FIG. 11 is a schematic diagram showing a structure of a lower fixing frame of the present disclosure.

As shown in FIG. 11, the lower fixing frame 30 comprises a mounting portion 31 extending along the pointed insert 40. The mounting portion 31 comprises a mounting hole configured to fix or disassemble the connecting tube 41. In some embodiments, a number of clamping portions 3003 are arranged on an inner wall of the mounting hole 3002 along a circumferential direction. The connecting tube 41 is engaged in the mounting hole 3002. Or, in some embodiments, the mounting hole is a hole with internal threads (not shown in the drawings). The connecting tube 41 comprises external threads, so that the connecting tube 41 is detachably connected to the lower fixing frame 30 through a threaded connection, which further reduces the transportation space.

Figure 9:
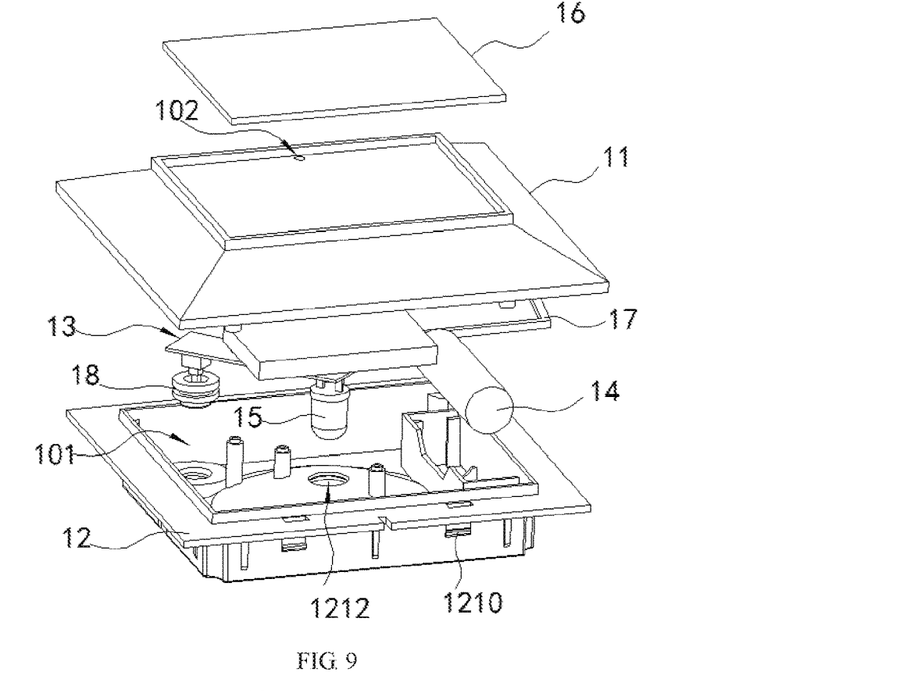
FIG. 9 is a schematic diagram showing a structure of a lamp base of the present disclosure.

As shown in FIG. 9, in some embodiments, the lamp base 10 comprises an upper cover 11 and an upper fixing frame 12. A closed chamber 101 is arranged in the lamp base 10. At least portions of a control module 13, a power module 14 and lamp beads 15 are arranged in the closed chamber 101.

In the embodiment, the power module 14 comprises a solar panel 16 arranged on a top portion of the upper cover 11 and a rechargeable battery (such as lithium battery or accumulator) electrically connected with the solar panel 16. The rechargeable battery is arranged in the closed chamber 101. A top portion of the upper cover 11 defining a wire hole 102 communicated with the closed chamber 101. And conductive wires of the solar panel 16 pass through the wire hole 102 to electrically connect with the rechargeable battery. In order to improve waterproof performance of the closed chamber 101, a notch with a waterproof structure may be arranged on a top portion of the upper cover 11. The solar panel 16 with a panel structure is installed on the notch. The wire hole 102 may be arranged on an inner side of the notch to prevent rainwater from flowing into the closed chamber 101 from the wire hole 102.

Optionally, a waterproof ring 17 is arranged on a portion enclosed by the upper cover 11 and the upper fixing frame 12.

Figure 10:
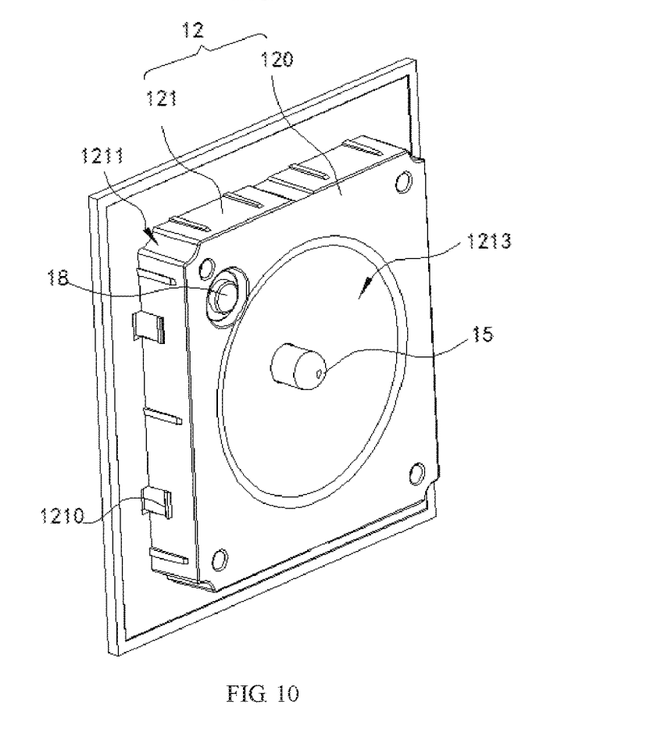
FIG. 10 is a schematic diagram showing a structure of an upper fixing frame of the present disclosure.

As shown in FIGS. 10 and 11, both of the upper fixing frame 12 and the lower fixing frame 30 comprise a bottom surface 120 and a plurality of side surfaces 121. Through holes 1212 are arranged on the bottom surface 120 of the upper fixing frame 12. The control module comprises a power switch. At least some of the lamp beads 15 and part of the power switch stretch out downward from the through holes 1212. The bottom portion of the lamp is mounted and enclosed along multiple side surfaces 121 of the upper fixing frame 12 and multiple side surfaces 121 of the lower fixing frame 30 through a plurality of supporting frames 21, and the protruding lamp beads 15 and the protruding power switch 18 are enclosed in the inner cavity 201, which protect the power switch 18 and lamp beads 15 to avoid water seepage.

In some embodiments, the mounting method of the supporting frames 21 and the side surfaces 121 is selected from snap connection, plug connection, etc. In the embodiment, first snaps 1210 are arranged on some or all of the side surfaces 121 of the upper fixing frame 12. Second snaps 3001 are arranged on some or all of the side surfaces 121 of the lower fixing frame 30. First snap positions 2103 matching with the first snaps 1210 and second snap positions 2104 matching with the second snaps 3001 are arranged on the supporting frames 21. Thus, when assembling, some or all of the supporting frames 21 are fixed together with the upper fixing frame 12 and the lower fixing frame 30 to improve a stability of the entire supporting frames 21 and facilitate disassembly and assembly.

Optionally, a limiting groove 1211 is provided between two adjacent side surfaces 121. When the supporting frames 21 are enclosed to form the housing 20, the rotating shafts 2101 and the bayonets 2102 of the supporting frames 21 are respectively arranged in the limiting grooves 1211. The limiting grooves 1211 are concave arc-shaped grooves. When the C-shaped bayonets 2102 are arranged in the limiting grooves 1211, the concave arc-shaped limiting grooves and the C-shaped bayonets form closed rotating holes, and the rotating shafts 2101 are limited in a respective rotating hole.

Optionally, both of the lower fixing frame 30 and the supporting frames 21 comprise hollowed-out holes 200. In some embodiments, the hollowed-out holes 200 are pattern holes with a visual effect and an aesthetic feeling.

The present disclosure is not limited to the above-mentioned embodiments, as long as the solutions mentioned in the specification fall within the protection scope of the present disclosure.

The above embodiments adopt specific examples to illustrate the present disclosure, which are only used to help understand the present disclosure and not to limit the present disclosure. For those skilled in the art to, based on the idea of the present disclosure, several simple deductions, modifications or substitutions can also be made, which shall be fall within the scope of the present disclosure.

What is claimed is:

1. A lamp, comprising
a housing with an inner cavity;
a lower fixing frame; and
a lamp base;
wherein at least a portion of the lamp base is disposed in the inner cavity, the housing comprises a plurality of supporting frames; the supporting frames are movably connected end by end to enclose the inner cavity; two adjacent supporting frames are detachably connected with each other; wherein the plurality of supporting frames comprises first supporting frames and second supporting frames; at least some of the first supporting frames comprise rotating shafts; at least some of the second supporting frames comprise bayonets; the rotating shafts are engaged with the bayonets of the second supporting frames; the lamp base comprises an upper cover and an upper fixing frame;
wherein a limiting groove is arranged between two adjacent side surfaces of the upper fixing frame and the lower fixing frame, and the rotating shafts and the bayonets are arranged in the limiting groove.

2. The lamp according to claim 1, wherein the first supporting frames or the second supporting frames are foldable around connection positions of the first supporting frames and the second supporting frames; and the first supporting frames and the second supporting frames are detachable from each other.

3. The lamp according to claim 2, wherein the bayonets are C-shaped bayonets.

4. The lamp according to claim 2, wherein; the lower fixing frame is arranged on a bottom portion of the supporting frames; the lower fixing frame is arranged opposite to the lamp base.

5. The lamp according to claim 4, a closed chamber is arranged in the lamp base; at least portions of a control module; a power module is arranged in the closed chamber.

6. The lamp according to claim 5, wherein the power module comprises a solar panel arranged on a top portion of the upper cover and a rechargeable battery electrically connected with the solar panel; the rechargeable battery is arranged in the closed chamber; a top portion of the upper cover defining a wire hole communicated with the closed chamber; and conductive wires of the solar panel pass through the wire hole to electrically connect with the rechargeable battery.

7. The lamp according to claim 5, wherein a waterproof ring is arranged on a portion enclosed by the upper cover and the upper fixing frame.

8. The lamp according to claim 5, wherein both of the upper fixing frame and the lower fixing frame comprise a bottom surface and a plurality of side surfaces; through holes are arranged on the bottom surface of the upper fixing frame.

9. The lamp according to claim 8, wherein the control module comprises a power switch; the power switch stretches out downward from the bottom surface of the upper fixing frame.

10. The lamp according to claim 8, wherein first snaps are arranged on at least some of the side surfaces of the upper fixing frame; and first snap positions matching with the first snaps are arranged on the supporting frames.

11. The lamp according to claim 8, wherein second snaps are arranged on at least some of the side surfaces of the lower fixing frame; and second snap positions matching with the second snaps are arranged on the supporting frames.

12. The lamp according to claim 6, wherein the lamp base is of a trapezoidal structure.

13. The lamp according to claim 10, wherein both of the lower fixing frame and the supporting frames comprise hollowed-out holes.

14. The lamp according to claim 2, wherein a pointed insert is arranged on the lower fixing frame.

15. The lamp according to claim 14, wherein the pointed insert comprises a connecting tube and a ground inserting rod; wherein the ground inserting rod is of a cross cone shape; a bottom portion of the ground inserting rod is of a tip structure.

16. The lamp according to claim 15, wherein the lower fixing frame comprises a mounting portion extending along the pointed insert; and the mounting portion comprises a mounting hole configured to fix the connecting tube.

17. The lamp according to claim 16, wherein a number of clamping portions are arranged on an inner wall of the mounting hole along a circumferential direction; the connecting tube is detachably connected with the lower fixing frame.

\* \* \* \* \*